United States Patent
Weerasinghe et al.

(10) Patent No.: US 9,091,154 B2
(45) Date of Patent: Jul. 28, 2015

(54) SYSTEMS AND METHODS FOR HYBRID CABLE TELEMETRY

(71) Applicant: Schlumberger Technology Corporation, Sugar Land, TX (US)

(72) Inventors: Nalin Weerasinghe, Imbulgoda (LK); Tadashi Tajima, Machida (JP); Motohiro Nakanouchi, Hachioji (JP); David Santoso, Sugar Land, TX (US); Kenji Endo, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 153 days.

(21) Appl. No.: 13/851,971

(22) Filed: Mar. 28, 2013

(65) Prior Publication Data
US 2014/0292530 A1  Oct. 2, 2014

(51) Int. Cl.
*E21B 47/12* (2012.01)
*G02B 6/38* (2006.01)

(52) U.S. Cl.
CPC .............. *E21B 47/122* (2013.01); *E21B 47/12* (2013.01); *G02B 6/3817* (2013.01)

(58) Field of Classification Search
CPC .............................. G02B 6/3817; E21B 47/12
USPC .......... 340/853.1, 853.2, 854.3, 854.6, 854.7, 340/854.9; 385/101; 175/40
See application file for complete search history.

(56) References Cited

U.S. PATENT DOCUMENTS

| | | |
|---|---|---|
| 4,522,464 A | 6/1985 | Thompson et al. |
| 5,202,944 A | 4/1993 | Riordan |
| 5,493,626 A | 2/1996 | Schultz et al. |
| 5,495,547 A | 2/1996 | Rafie et al. |
| 6,229,453 B1 | 5/2001 | Gardner et al. |
| 7,912,333 B2 | 3/2011 | Varkey et al. |
| 7,920,765 B2 | 4/2011 | Varkey |
| 8,274,400 B2 | 9/2012 | Wilson et al. |
| 8,772,222 B2 | 7/2014 | Baker et al. |
| 2005/0249503 A1* | 11/2005 | Sun et al. ................... 398/135 |
| 2006/0152383 A1 | 7/2006 | Yamate et al. |
| 2009/0120689 A1* | 5/2009 | Zaeper et al. .................. 175/40 |
| 2009/0196557 A1 | 8/2009 | Varkey et al. |
| 2010/0194586 A1 | 8/2010 | Tjihang et al. |

(Continued)

FOREIGN PATENT DOCUMENTS

| WO | 2013/101569 | 7/2013 |
|---|---|---|
| WO | 2013/101581 | 7/2013 |

*Primary Examiner* — Andrew Bee
(74) *Attorney, Agent, or Firm* — Daryl R. Wright; Jody DeSefanis

(57) ABSTRACT

Systems, apparatuses, and methods for hybrid cable telemetry. The methods can include positioning a toolstring in a wellbore. The toolstring can include an uphole telemetry cartridge and a downhole telemetry cartridge respectively adapted to send and receive telemetry data. The toolstring can also include a hybrid logging cable having optical fibers and copper conductors that can operatively couple the uphole telemetry cartridge to the downhole telemetry cartridge. The method can also include transferring data between the uphole telemetry cartridge and the downhole telemetry cartridge across the optical fibers and the copper conductors. The method can further include measuring a data transmission rate on the optical fibers and the copper conductors. The method can also include comparing the data transmission rate to a predetermined threshold. The method can further include detecting a data transmission failure when the data transmission rate falls below the predetermined threshold.

20 Claims, 5 Drawing Sheets

(56) References Cited

U.S. PATENT DOCUMENTS

| | | |
|---|---|---|
| 2010/0206582 A1* | 8/2010 | Meyyappan et al. ......... 166/378 |
| 2010/0328096 A1 | 12/2010 | Hache et al. |
| 2011/0044697 A1* | 2/2011 | Peter et al. ................... 398/140 |
| 2011/0163891 A1 | 7/2011 | Wilson et al. |
| 2011/0266008 A1* | 11/2011 | Worrall et al. ................ 166/385 |
| 2013/0039625 A1* | 2/2013 | Herbst .......................... 385/101 |
| 2014/0085099 A1* | 3/2014 | Menezes et al. ........... 340/855.1 |
| 2014/0152456 A1 | 6/2014 | Olson et al. |
| 2014/0152459 A1 | 6/2014 | Olson et al. |
| 2014/0152460 A1 | 6/2014 | Santoso et al. |

* cited by examiner

SYSTEMS AND METHODS FOR HYBRID CABLE TELEMETRY

BACKGROUND

The present disclosure relates to hybrid cable telemetry. More specifically, the present disclosure relates to systems, apparatuses and methods for bi-directional communication across a hybrid logging cable having both optical fiber and copper conductors.

Hydrocarbon fluids, such as oil and natural gas, may be obtained from a subterranean geologic formation, referred to as a reservoir, by drilling a well that penetrates the hydrocarbon-bearing formation. A variety of downhole tools may be used in various areas of oil and natural gas services. In some cases, downhole tools may be used in a well for surveying, drilling, and production of hydrocarbons. The downhole tools may communicate with the surface via various telemetry systems.

Demand for higher data transmission rates across wireline telemetry systems is growing rapidly due to higher resolution sensors, faster logging speeds, and additional tools available for a single wireline cable. Although current electronic telemetry systems have evolved, increasing the data transmission rates from about 500 kbps (kilobits per second) to 2 Mbps (megabits per second) over the last decade, data transmission rates may still put practical limits on the higher capabilities of the higher resolution sensors. For some combinations of acoustic/imaging tools used with traditional logging tools, the data transmission rate may exceed 4 Mbps.

Descriptions of combination optical and copper logging cables can be found in U.S. Pat. Nos. 7,920,765; 7,912,333; 4,522,464; 5,495,547; 5,202,944; and 5,493,626. Optical wireline telemetry is described in U.S. Pat. No. 8,274,400.

Applications of the disclosed embodiments of the present disclosure are not limited to these illustrated examples, as different industrial applications may benefit from implementations of the following disclosure.

SUMMARY

In at least one aspect, the disclosure relates to a system for hybrid wireline telemetry. The system can include an uphole telemetry cartridge adapted to send and receive telemetry data. The system can also include a downhole telemetry cartridge adapted to send and receive telemetry data. The system can also include a hybrid logging cable operatively coupling the uphole telemetry cartridge to the downhole telemetry cartridge. The hybrid logging cable can include optical fibers and copper conductors. The optical fibers and the copper conductors may be adapted to transfer telemetry data.

In at least one aspect, the disclosure relates to a hybrid telemetry cartridge for hybrid wireline telemetry. The hybrid telemetry cartridge can include a telemetry unit having a power module and a telemetry processor chip. The hybrid telemetry cartridge can include an optical-electrical adaptor having an optical-electrical interface operatively coupled to the telemetry processor chip. The hybrid telemetry cartridge can also include a logging head coupled to the telemetry cartridge and the optical-electrical adaptor configurable to couple to a hybrid logging cable. The hybrid logging cable can include optical fibers and copper conductors.

In at least one aspect, the disclosure relates to a method for hybrid wireline telemetry. The method can include positioning a toolstring in a wellbore. The toolstring can include an uphole telemetry cartridge adapted to send and receive telemetry data. The toolstring can include a downhole telemetry cartridge adapted to send and receive telemetry data. The toolstring can include a hybrid logging cable operatively coupling the uphole telemetry cartridge to the downhole telemetry cartridge. The hybrid logging cable can include optical fibers and copper conductors. The method can include transferring data between the uphole telemetry cartridge and the downhole telemetry cartridge across the optical fibers and the copper conductors of the hybrid logging cable. The method can include measuring a data transmission rate on the optical fibers and the copper conductors. The method can include comparing the data transmission rate to a predetermined threshold. The method can include detecting a transmission failure on the optical fibers and/or the copper conductors when the data transmission rate falls below the predetermined threshold.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for hybrid cable telemetry are described with reference to the following figures. Like numbers are used throughout the figures to reference like features and components.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to systems, apparatuses, and methods for communication between surface and downhole equipment over a hybrid optical and copper wireline logging cable, either concurrently or independently. Copper provides concurrent or redundant communication to the optical communication, in an integrated logging cable. Using smart telemetry cartridges of the present disclosure, when a communication failure occurs over optical fiber or copper, the telemetry cartridge may automatically switch from optical to copper, or copper to optical. Optionally, the telemetry cartridge may generate an alert to a human operator interface to enable an operator to manually switch from optical to copper, or copper to optical, or address the problem.

Figure 1:
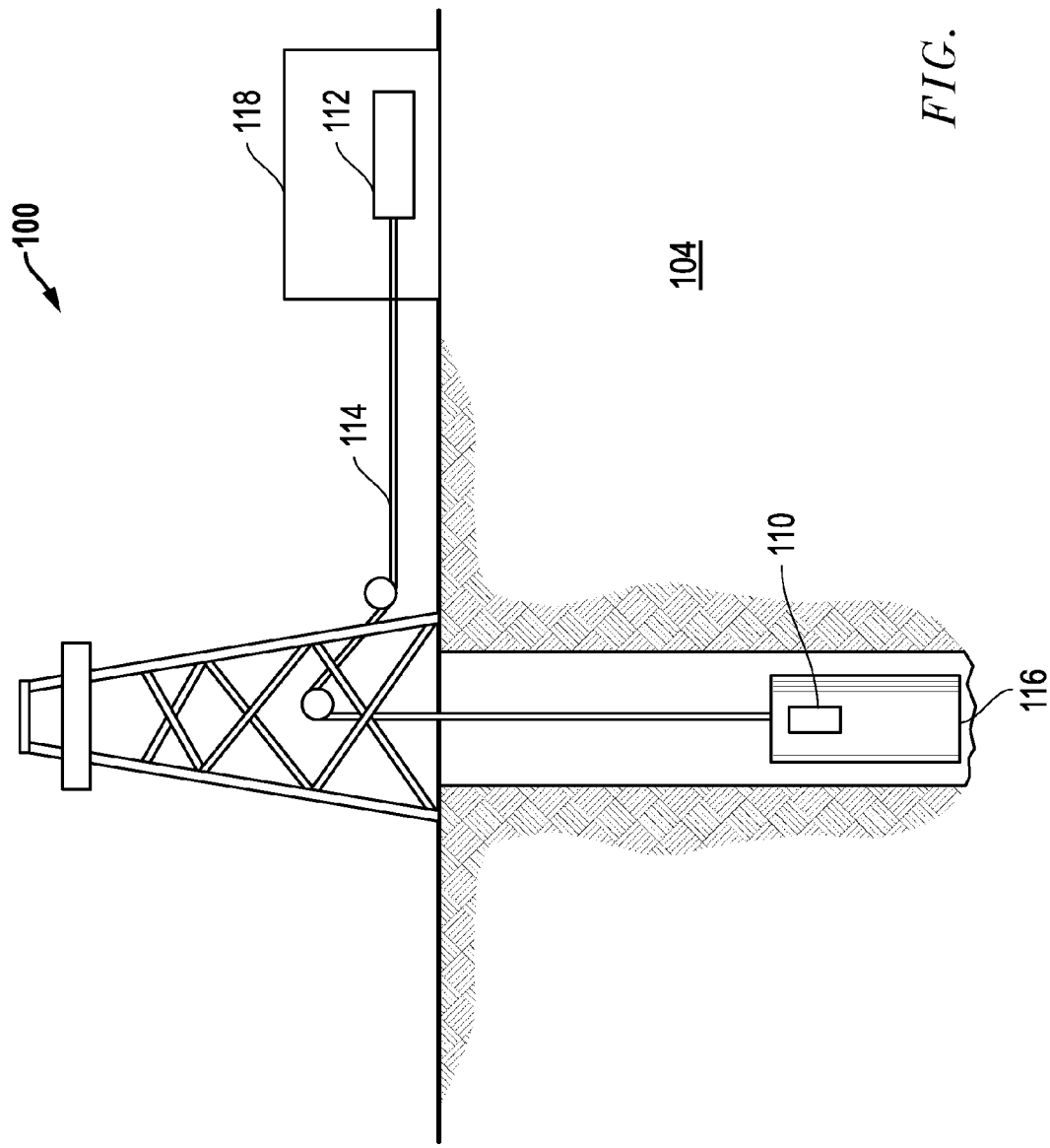
FIG. 1 is a schematic representation of a well site with a borehole traversing subsurface formations.

Referring to FIG. 1, an example embodiment wireline logging operation is illustrated with respect to the wellsite system 100 employed in a wellbore 102 traversing a subsurface formation 104. A downhole telemetry cartridge 110 is connected to a toolstring 116. In a well-logging operation, a plurality of tools may be connected in the toolstring 116. The tools of the toolstring 116 communicate with the downhole telemetry cartridge 110 via a bi-directional interface. The tools of the toolstring 116 may be connected to the downhole telemetry cartridge 110 over a common data bus or communication channel. Alternatively, each tool of the toolstring 116 may be individually, directly connected to the downhole telemetry cartridge 110. In one embodiment, the downhole telemetry cartridge 110 may be a separate unit, which is mechanically and electrically connected to the tools in the toolstring 116. In one embodiment, the downhole telemetry cartridge 110 may be integrated into the housing of one of the well-logging tools 116.

The downhole telemetry cartridge 110 is operatively coupled to a wireline cable 114. The tools of the toolstring 116, including the downhole telemetry cartridge 110, may be lowered into the wellbore 102 on the wireline cable 114.

A surface data acquisition computer 118 is located at the surface end of the wireline cable 114. The surface data acquisition computer 118 includes or couples to an uphole telemetry unit 112. The data acquisition computer 118 may provide control of the components in the toolstring 116 and process and store the data acquired downhole. The data acquisition computer 118 may communicate with the uphole telemetry unit 112 via a bi-directional interface.

The uphole telemetry unit 112 may modulate downlink commands from the acquisition computer 118 for transmission down the cable 114 to the toolstring 116 and demodulates uplink data from the toolstring 116 for processing and storage by the surface data acquisition computer 118.

The downhole telemetry cartridge 110 contains circuitry to modulate uplink data from the tools of the toolstring 116 for transmission up the wireline cable 114 to the surface data acquisition computer 118 and demodulate downlink commands from the surface data acquisition computer 118 for the tools of the toolstring 116.

Figure 2:
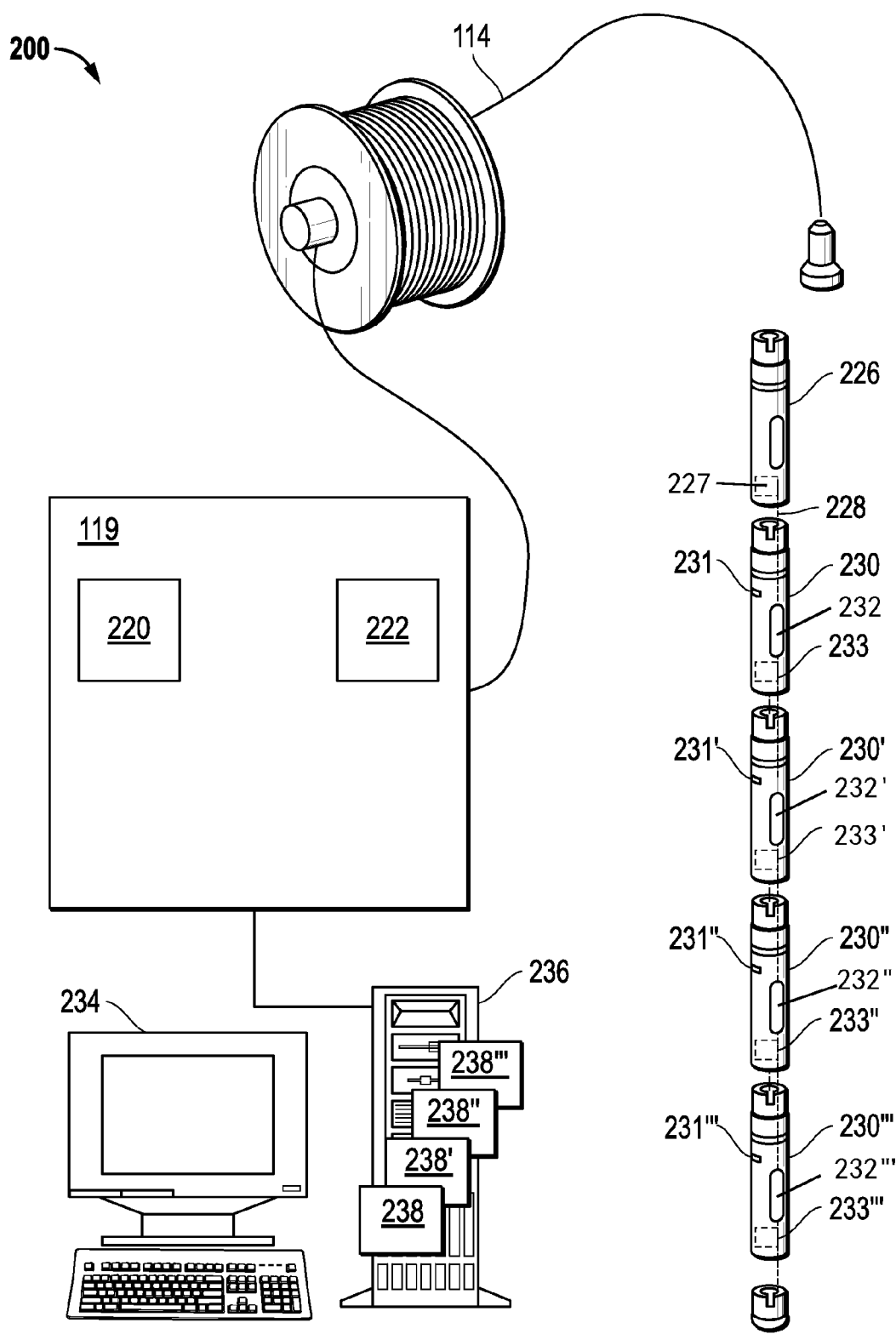
FIG. 2 illustrates schematically one example cable telemetry system of the present disclosure for monitoring subterranean formations in accordance with the present disclosure.

A more detailed schematic view of one example wireline system 200 is shown in FIG. 2. The wireline system 200 shown comprises a surface acquisition module/surface modem (DTM) 220 having a telemetry interface module 222, which can be located at the surface as a portion of or operatively coupled to the surface data acquisition front-end 119 (a component of surface data acquisition computer 118), coupled to the wireline cable 114. The wireline system 200 shown also comprises a downhole modem (DTC) 226 as a portion of the downhole telemetry cartridge 110 at the head of a toolstring 116 which includes a number of downhole tools, 230, 230', 230", etc., each containing a respective interface package, 232, 232', 232", etc., through which they are in communication with the DTC 226 via a toolbus 228. The DTM 220 and the DTC 226 are operatively coupled by the wireline cable 114. The wireline system 200 may handle data flowing in a bi-directional manner, i.e., from the tools, etc., via the respective interface package 232, 232', etc. and the toolbus 228, to the DTC 226 and then to the DTM 220 over the cable 114 ("uplink"), and the reverse direction from the DTM 220 to the DTC 226 and tools 230, 230', etc., over the same path ("downlink"). The wireline system 200 provides a communication path from the tools, 230, 230', etc., to the DTM 220 of the data acquisition computer 118 so that data acquired by sensors 231, 231', etc. of the tools, 230, 230', etc., can be processed and analyzed at the surface, as well as communication between tools 230, 230', etc. Each individual tool 230, 230', 230", etc. may include a node command buffer at the interface package 232, as well as a logic controller 233 of its own.

The downhole telemetry cartridge 226 can include a downhole master node controller 227 that may examine packets sent by each respective tool 230, 230', etc. Data communicated in either direction may first be copied and buffered at the master node controller 227, and then sent to the recipient.

A surface computer 234 can store and execute a surface data dispatcher module 236 (which may be, in an embodiment, a software data routing module, such as SCHLUMBERGER™'s MaxWell Framework™). The surface computer 234 can also store and execute a plurality of surface tool-specific applications 238, 238', etc. that analyze and use data obtained, respectively, by tools 230, 230', etc.

In an embodiment, the surface data acquisition front-end 119 comprises a SCHLUMBERGER™ hybrid eWAFE™ unit. In an embodiment, the DTC 226 comprises a hybrid telemetry cartridge. In an embodiment, the wireline cable 114 comprises a hybrid cable comprising a plurality of copper cables and a plurality of optical fibers.

Figure 3:
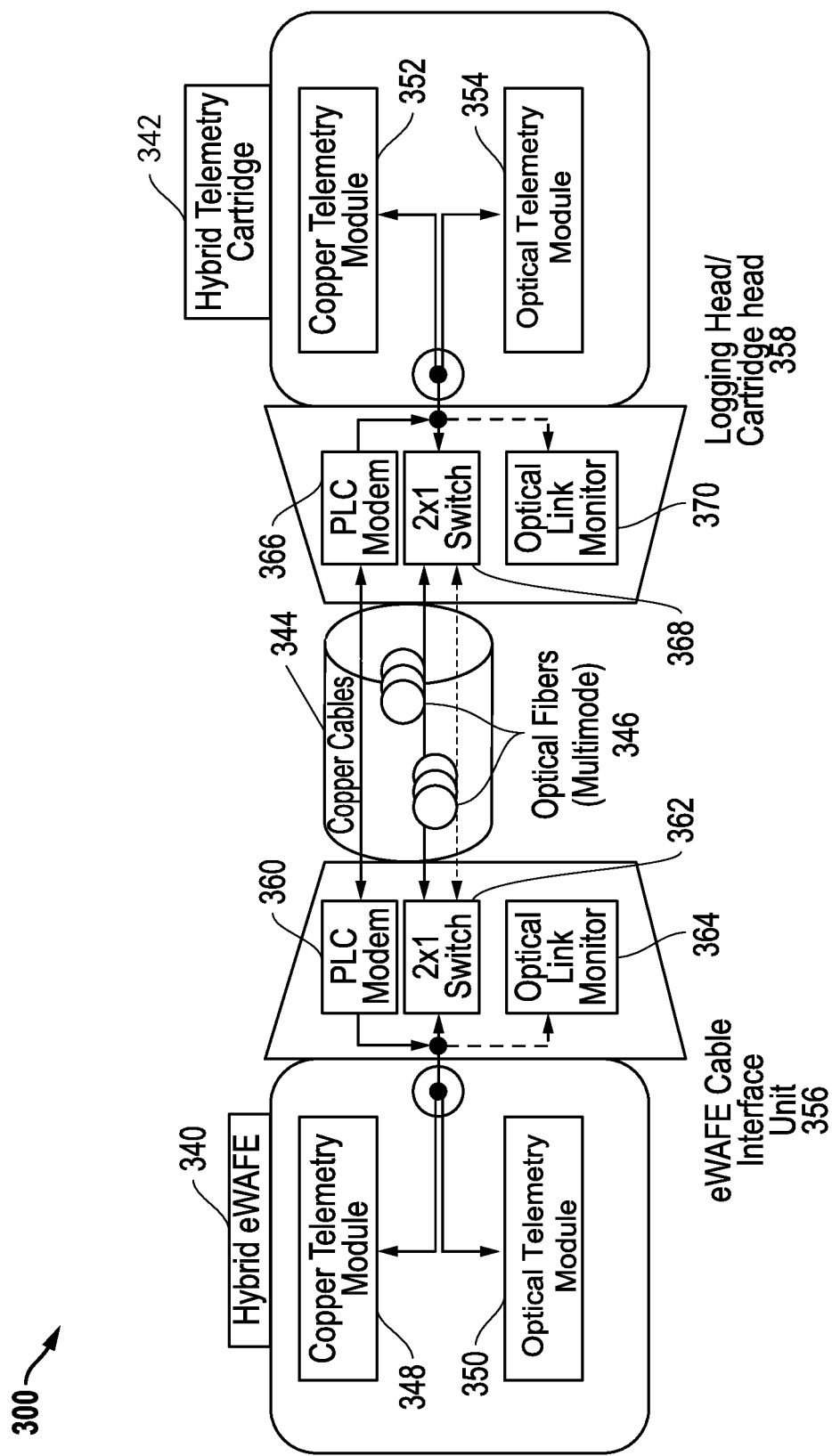
FIG. 3 illustrates a schematic for a hybrid telemetry system in accordance with the present disclosure.

Referring now to FIG. 3, a hybrid telemetry system schematic is shown in greater detail, which may be used for the communication functions in the wireline system 200 of FIG. 2. The hybrid telemetry system 300 includes a hybrid eWAFE 340 (a modified surface data acquisition front-end 119) operatively coupled to a hybrid telemetry cartridge 342 (a modified downhole telemetry cartridge 226) via the wireline cable 114. Wireline cable 114 is shown having both optical fibers 346 as well as copper cables 344. In an embodiment, the optical fibers 346 are multimode fibers. Uplink and/or downlink telemetry data may be transferred over the wireline cable 114 on any combination of the optical fibers 346 and the copper cables 344, as shown in Table 1.

TABLE 1

| Combination of Copper & Optical Telemetry | | |
|---|---|---|
| | Uplink Data | Downlink Data |
| 1 | Copper only | Copper only |
| 2 | Optical only | Optical only |
| 3 | Copper only | Optical only |
| 4 | Optical only | Copper only |
| 5 | Copper only | Copper and Optical |
| 6 | Optical only | Copper and Optical |
| 7 | Copper and Optical | Copper only |
| 8 | Copper and Optical | Optical only |

The surface hybrid eWAFE 340 includes an uphole copper telemetry module 348 as well as an uphole optical telemetry module 350. The downhole hybrid telemetry cartridge 342 likewise includes a downhole copper telemetry module 352 and a downhole optical telemetry module 354. The copper telemetry modules 348, 352 (both uphole and downhole respectively) may modulate, demodulate, and process uplink and downlink data for transmission across the copper cables 344, while the optical telemetry modules 350, 354 (both uphole and downhole respectively) may modulate, demodulate, and process uplink and downlink data for transmission across the optical fibers 346. The copper telemetry modules 348, 352 may, in an example embodiment, operate in the manner described in commonly assigned Patent Applications: PCT Patent Application Number—PCT/US12/70437, filed Dec. 19, 2012; PCT Patent Application Number—PCT/US12/70526, filed Dec. 19, 2012; U.S. patent application Ser. No. 13/705,127, filed Dec. 4, 2012; U.S. patent application Ser. No. 13/705,139, filed Dec. 4, 2012; U.S. patent application Ser. No. 13/705,130, filed Dec. 4, 2012; U.S. patent application Ser. No. 13/705,124, filed Dec. 4, 2012; each document is incorporated by reference in its entirety. The optical telemetry modules 350, 354 may, in an example embodiment, operate in the manner described in U.S. Pat. No. 8,274,400, commonly assigned, and incorporated by reference in its entirety.

At the uphole side, an adapter referred to as a cable interface unit 356 provides the physical coupling between the wireline cable 114 and the surface hybrid eWAFE 340. The cable interface unit 356 includes an uphole power line communication (PLC) modem 360 that can handle data carried on a conductor simultaneously used for electrical power transmission. The cable interface unit 356 includes an uphole switch 362 that can direct data between the copper cables 344 and the uphole optical telemetry module 350 and the uphole copper telemetry module 348, or the optical fibers 346 and the uphole optical telemetry module 350 and the uphole copper telemetry module 348. The cable interface unit 356 includes an uphole optical link monitor 364 that measures data signal rate over the optical fibers 346. In an embodiment, if the data signal rate over the optical fibers 346 falls below a threshold value, the uphole switch 362 may stop transmission of data over the optical fibers 346, and redirect the data over the copper cables 344 instead. In an embodiment, if the data signal rate over the optical fibers 346 falls below a threshold value, the uphole switch 362 may stop transmission of data over the optical fibers 346 and generate an alert to the operator of a possible communication failure.

At the downhole side, a logging head adaptor 358 provides the physical coupling between the downhole hybrid telemetry cartridge 342 and the wireline cable 114. In an embodiment, the logging head adaptor 358 may be functionally equivalent to the uphole adaptor—the cable interface unit 356. At the surface the cable interface unit 356 can be implemented with more freedom, i.e., either inside eWAFE, as separate unit in a cable interface board. However, in the downhole the logging head adaptor 358 may be limited in size, and thus may, in an embodiment, be implemented in logging head to enable communication with the surface with minimum downhole electronics involved. The logging head adaptor 358 also includes a downhole PLC modem 366 that can handle data carried on a conductor simultaneously used for electrical power transmission. The logging head adaptor 358 also includes a downhole switch 368 that can direct data between the copper cables 344 and the downhole optical telemetry module 354 and the downhole copper telemetry module 352, or the optical fibers 346 and the downhole optical telemetry module 354 and the downhole copper telemetry module 352. The logging head adaptor 358 also includes a downhole optical link monitor 370 that measures data signal rate over the optical fibers 346, and if the data signal rate over the optical fibers 346 falls below a threshold value, the downhole switch 368 stops transmission of data over the optical fibers 346, and transmits the data over the copper cables 344 instead.

Figure 4:
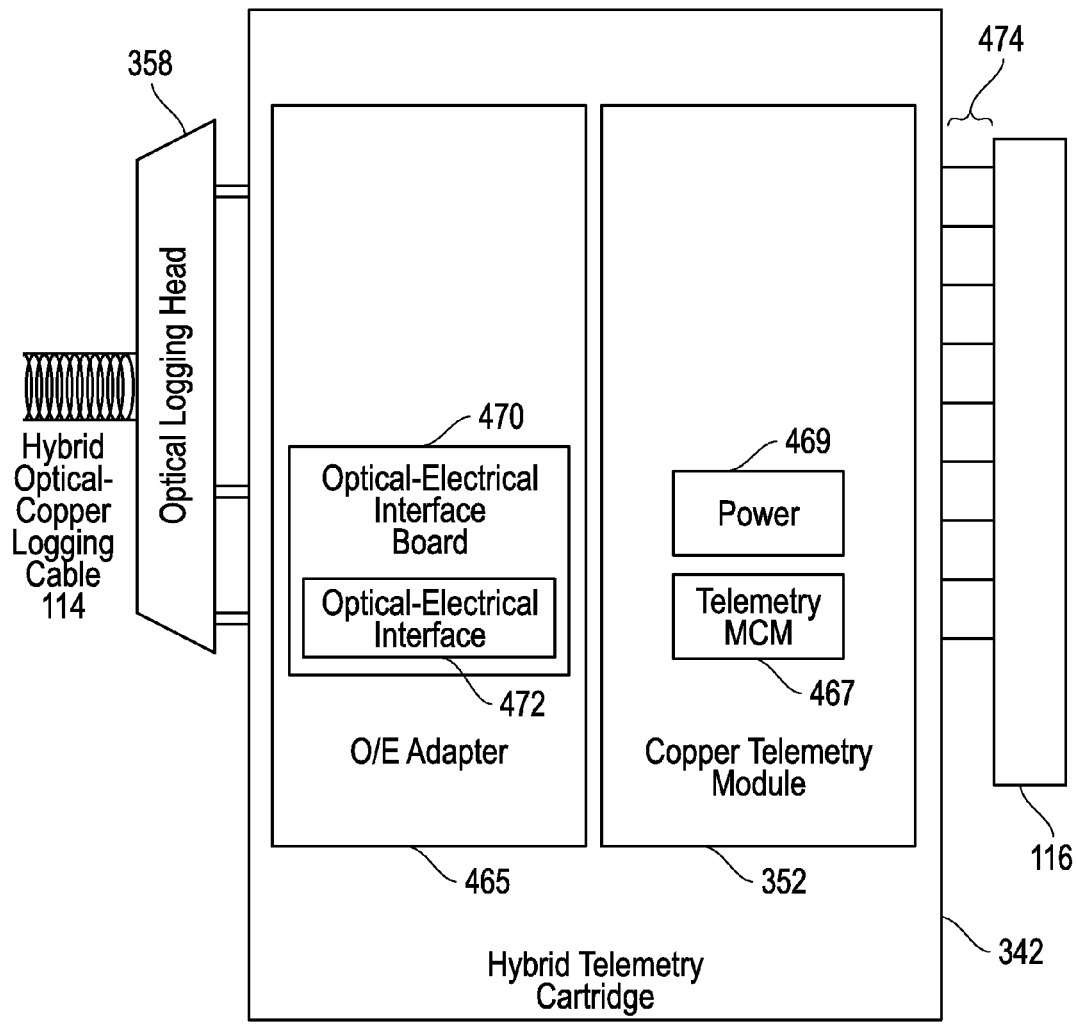
FIG. 4 shows a block diagram of a smart hybrid telemetry cartridge in accordance with the present disclosure.

Referring now to FIG. 4, a block diagram of a smart hybrid telemetry cartridge 342 is shown which may be used in the wireline system 200 of FIG. 2, or the hybrid telemetry system 300 of FIG. 3. At left, the wireline cable 114 couples to the logging head adaptor 358. The logging head adaptor 358 couples to the smart hybrid telemetry cartridge 342, as in FIG. 3. The hybrid telemetry cartridge 342 includes at least one optical-electrical adaptor 465 (which may also be considered as an optical telemetry module 354) and a copper telemetry module 352, as discussed above. The copper telemetry module 352 can include a telemetry multi-chip module (MCM) 467 that handles the telemetry data, and a power module 469 (which couples to the PLC modem 366 of the logging head 358 as shown in FIG. 3 and not further shown in FIG. 4) that powers the hybrid telemetry cartridge 342. The optical-electrical adaptor 465 includes an optical-electrical interface board 470 having an optical-electrical interface 472. The optical-electrical interface 472 receives telemetry data transmitted across the optical fibers 346 of the wireline cable 114, directed to the optical-electrical adaptor 465 by the downhole switch 368 of the logging head 358 (as shown in FIG. 3). The optical-electrical interface 472 converts the telemetry data from optical format to electrical format, and passes the telemetry data in electrical format to the telemetry MCM 467 of the copper telemetry module 352.

Couplers 474 at right operatively couple the hybrid telemetry cartridge 342 to toolstring 116 and plurality of tools 230, 230', 230" of FIG. 2.

In an embodiment, there may be a separate processor for telemetry data sent over fiber(s). In an embodiment, the adaptor may convert telemetry data sent over fiber(s) to electrical format so that the copper telemetry module can handle it in the same manner as data sent over copper. Downhole, measurements are taken and transformed to digital data and can be gathered using existing tool bus, for example, Data Transfer Bus (DTB), Fast Tool Bus (FTB), or Enhanced Fast Tool Bus (EFTB) protocols.

At the downhole telemetry cartridge 342, these collected data are modulated for transmission over a copper cable or optical fiber(s). For transmission over fiber(s), the modulation can be as straightforward as ON/OFF the light over fiber(s) corresponding to '0' and '1'. In the case of copper cable, various more sophisticated modulation schemes are contemplated herein.

Figure 5:
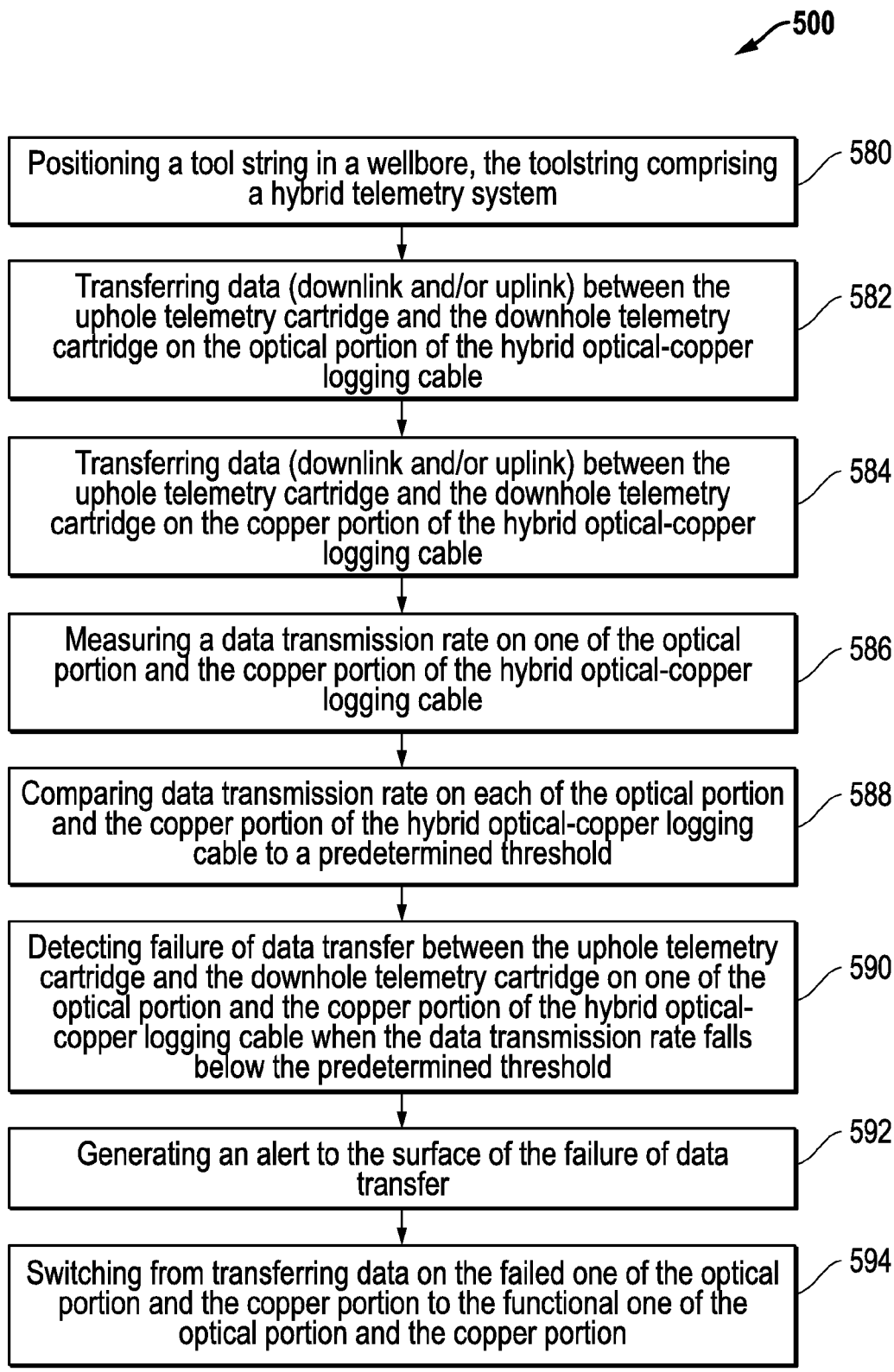
FIG. 5 illustrates a flowchart for a method for hybrid cable telemetry in accordance with the present disclosure.

Referring now to FIG. 5, a flowchart for a method for hybrid cable telemetry is shown. The method 500 begins with positioning 580 a tool string in a wellbore, the toolstring comprising a hybrid telemetry system 300 such as that described with respect to FIGS. 3 and 4. The method 500 continues with transferring 582 data (downlink and/or uplink) between the uphole telemetry cartridge 340 and the downhole telemetry cartridge 342 on the optical fibers 346 of the hybrid optical-copper logging cable 114. The method 500 continues with transferring 584 data (downlink and/or uplink) between the uphole telemetry cartridge 340 and the downhole telemetry cartridge 342 on the copper cables 344 of the hybrid optical-copper logging cable 114. As previously discussed, uplink and downlink telemetry data may be transferred concurrently or alternatingly, and in various combinations across the optical fibers 346 and/or the copper cables 344 of the hybrid wireline as described with respect to Table 1.

In an embodiment, the method 500 continues with measuring 586 a data transmission rate on one of the optical fibers 346 and the copper cables 344 of the hybrid optical-copper logging cable 114. The method 500 continues with comparing 588 data transmission rate on each of the optical fibers 346 and the copper cables 344 of the hybrid optical-copper logging cable 114 to a predetermined threshold. The method 500 continues with detecting 590 failure of data transfer between the uphole telemetry cartridge 340 and the downhole telemetry cartridge 342 on one of the optical fibers 346 and the copper cables 344 of the hybrid optical-copper logging cable 114, when the data transmission rate falls below the predetermined threshold. In this manner, the copper cables of the hybrid wireline cable serves as redundant telemetry for the optical fibers in case of failure, and vice versa. The method 500 optionally continues with generating 592 an alert to the surface of the failure of data transfer. For example, in an embodiment, at the surface acquisition front-end 119, an alert display may indicate to a human operator a window noting the data transmission rate over optical fiber(s). The method 500 continues with switching 594 from transferring data on the failed one of the optical fibers 346 and the copper cables 344 to a functional one of the optical fibers 346 and the copper cables 344. The switching 594 may be performed automatically, or manually by an operator in response to the alert generated at 592.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A system for hybrid wireline telemetry, comprising:
   an uphole telemetry cartridge adapted to send and receive telemetry data, comprising:
      an uphole optical link sensor that monitors a first data rate across the one or more optical fibers at the uphole telemetry cartridge; and
      an uphole switch adapted to switch telemetry data from the one or more optical fibers to the one or more copper conductors when the first data rate across the one or more optical fibers falls below a first predetermined threshold;
   a downhole telemetry cartridge adapted to send and receive telemetry data;
   a hybrid logging cable operatively coupling the uphole telemetry cartridge to the downhole telemetry cartridge, the hybrid logging cable comprising one or more optical fibers and one or more copper conductors, the one or more optical fibers and the one or more copper conductors adapted to transfer telemetry data.

2. The system according to claim 1, wherein transfer of telemetry data on the one or more optical fibers and the one or more copper conductors is concurrent.

3. The system according to claim 1, wherein one of the one or more optical fibers and the one or more copper conductors is configurable as a backup communication link to another of the one or more optical fibers and the one or more copper conductors.

4. The system according to claim 1, wherein the uphole telemetry cartridge comprises:
   a uphole copper telemetry module that processes the telemetry data transferred across the one or more optical fibers and the one or more copper conductors; and
   an uphole optical-electrical adaptor operatively coupled to the uphole copper telemetry module that converts telemetry data transferred on the one or more optical fibers to a format processed by the uphole copper telemetry module.

5. The system according to claim 1, wherein the downhole telemetry cartridge comprises:
   a downhole optical link sensor that monitors a second data rate across the one or more optical fibers at the downhole telemetry cartridge; and
   a downhole switch adapted to switch telemetry data from the one or more optical fibers to the one or more copper conductors when the second data rate across the one or more optical fibers falls below a second predetermined threshold.

6. The system according to claim 1, wherein the downhole telemetry cartridge comprises:
   a downhole copper telemetry module that processes the telemetry data transferred across the one or more optical fibers and the one or more copper conductors; and
   a downhole optical-electrical adaptor operatively coupled to the downhole copper telemetry module that converts telemetry data transferred on the one or more optical fibers to a format processed by the downhole copper telemetry module.

7. The system according to claim 1, wherein the telemetry data comprises one of uplink data and downlink data.

8. A hybrid telemetry cartridge for hybrid wireline telemetry, comprising:
   a telemetry unit comprising a power module and a telemetry processor chip;
   an optical-electrical adaptor comprising an optical-electrical interface operatively coupled to the telemetry processor chip;
   a logging head coupled to the telemetry unit and the optical-electrical adaptor configurable to couple to a hybrid logging cable comprising one or more optical fibers and one or more copper conductors;
   an optical link sensor that senses a data rate across the one or more optical fibers at the logging head;
   wherein the telemetry unit is adapted to compare the data rate across the one or more optical fibers to a predetermined threshold; and
   a switch adapted to switch telemetry data from the one or more optical fibers to the one or more copper conductors when the data rate across the one or more optical fibers falls below the predetermined threshold.

9. The hybrid telemetry cartridge according to claim 8, wherein the optical-electrical adaptor is integral to the telemetry unit.

10. A method for hybrid wireline telemetry, comprising:
    positioning a toolstring in a wellbore, the toolstring comprising:
       an uphole telemetry cartridge adapted to send and receive telemetry data;
       a downhole telemetry cartridge adapted to send and receive telemetry data;
       a hybrid logging cable operatively coupling the uphole telemetry cartridge to the downhole telemetry cartridge, the hybrid logging cable comprising one or more optical fibers and one or more copper conductors;
    transferring data between the uphole telemetry cartridge and the downhole telemetry cartridge across at least one of the one or more optical fibers and one or more copper conductors of the hybrid logging cable;
    measuring a data transmission rate on the at least one of the one or more optical fibers and one or more copper conductors;
    comparing the data transmission rate to a predetermined threshold; and
    detecting a transmission failure on the at least one of the one or more optical fibers and one or more copper conductors when the data transmission rate falls below the predetermined threshold.

11. The method according to claim 10, further comprising generating an alert to the uphole telemetry cartridge relating to the transmission failure.

12. The method according to claim 10, further comprising halting transfer of telemetry data on the at least one of the one or more optical fibers and one or more copper conductors having the transmission failure; and switching transfer of telemetry data to another of the one or more optical fibers and one or more copper conductors.

13. The method according to claim 10, wherein transferring data across at least one of the one or more optical fibers and one or more copper conductors comprises concurrent data transfer on both optical fibers and copper conductors.

14. The method according to claim 10, wherein the telemetry data comprises one of uplink data and downlink data.

15. The method according to claim 14, further comprising transferring telemetry data according to one of the following combinations:
uplink data across the one or more copper conductors and downlink data across the one or more copper conductors;
uplink data across the one or more optical fibers and downlink data across the one or more optical fibers;
uplink data across the one or more copper conductors and downlink data across the one or more optical fibers;
uplink data across the one or more optical fibers and downlink data across the one or more copper conductors;
uplink data across the one or more copper conductors and downlink data across the one or more copper conductors and the one or more optical fibers;
uplink data across the one or more optical fibers and downlink data across the one or more copper conductors and the one or more optical fibers;
uplink data across the one or more copper conductors and the one or more optical fibers and downlink data across the one or more copper conductors; and
uplink data across the one or more copper conductors and the one or more optical fibers and downlink data across the one or more optical fibers.

16. A system for hybrid wireline telemetry, comprising:
an uphole telemetry cartridge adapted to send and receive telemetry data;
a downhole telemetry cartridge adapted to send and receive telemetry data, comprising;
a downhole optical link sensor that monitors a data rate across the one or more optical fibers at the downhole telemetry cartridge; and
a downhole switch adapted to switch telemetry data from the one or more optical fibers to the one or more copper conductors when the data rate across the one or more optical fibers falls below a second predetermined threshold; a hybrid logging cable operatively coupling the uphole telemetry cartridge to the downhole telemetry cartridge, the hybrid logging cable comprising one or more optical fibers and one or more copper conductors, the one or more optical fibers and the one or more copper conductors adapted to transfer telemetry data.

17. The system according to claim 16, wherein transfer of telemetry data on the one or more optical fibers and the one or more copper conductors is concurrent.

18. The system according to claim 16, wherein one of the one or more optical fibers and the one or more copper conductors is configurable as a backup communication link to another of the one or more optical fibers and the one or more copper conductors.

19. The system according to claim 16, wherein the telemetry data comprises one of uplink data and downlink data.

20. The system according to claim 16, wherein the uphole telemetry cartridge generates an alert to indicate the transmission failure.

* * * * *